June 1, 1926.
L. JAENICHEN
SCALE
Filed July 7, 1921   2 Sheets-Sheet 2
1,586,747
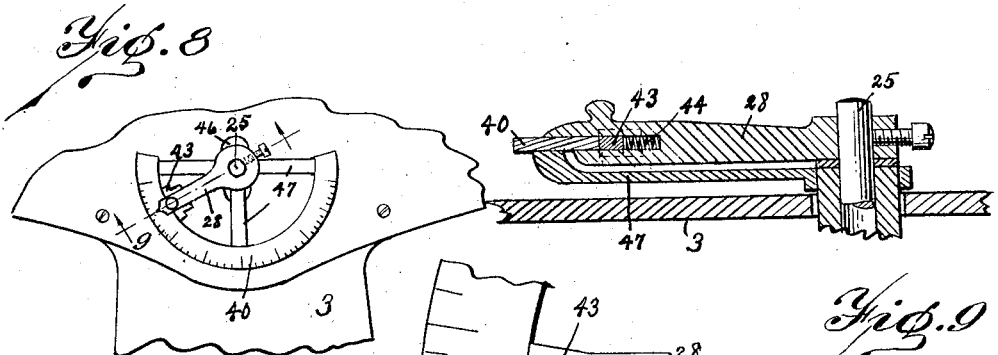
Fig. 8
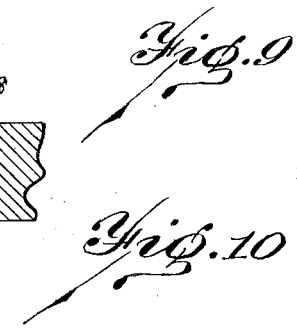
Fig. 9
Fig. 10
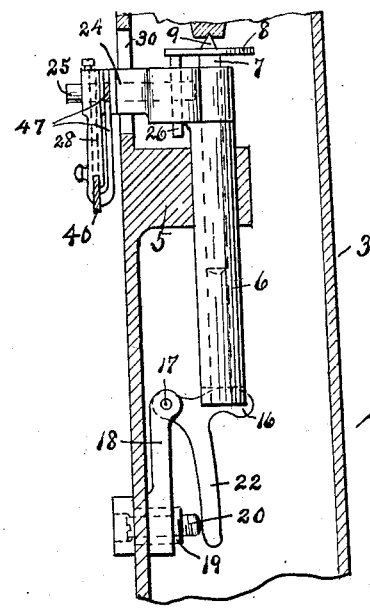
Fig. 11
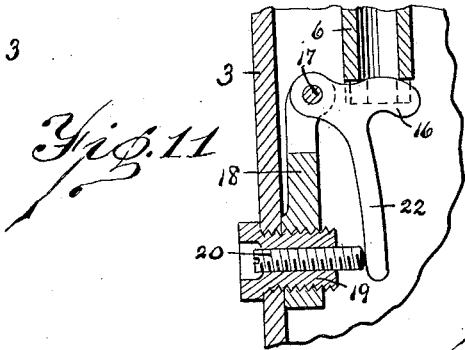
Fig. 12
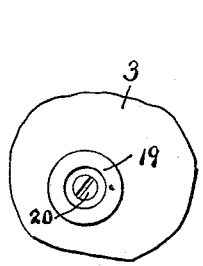
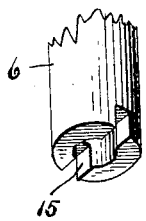
Fig. 13
Fig. 14
INVENTOR.
Louis Jaenichen
BY Edward N. Pagelsen
ATTORNEY.

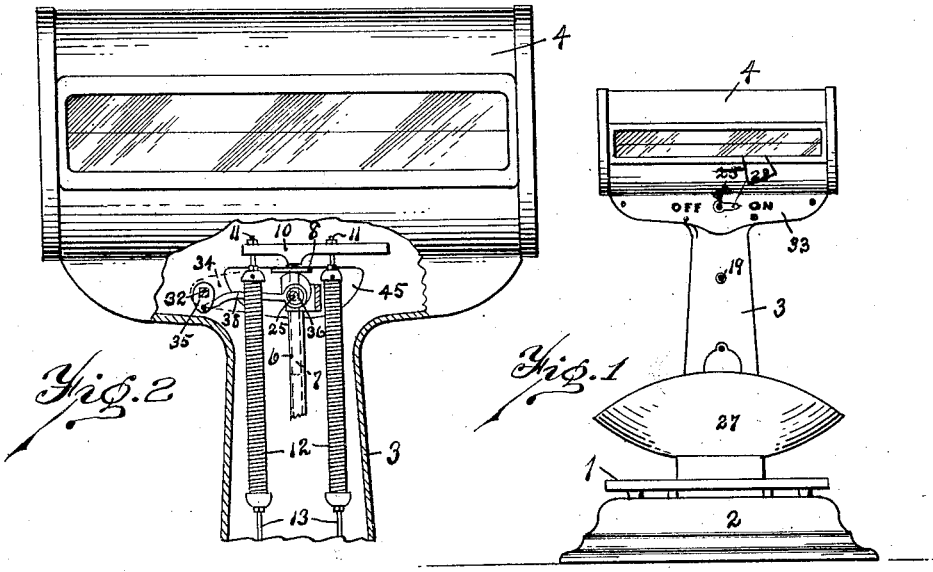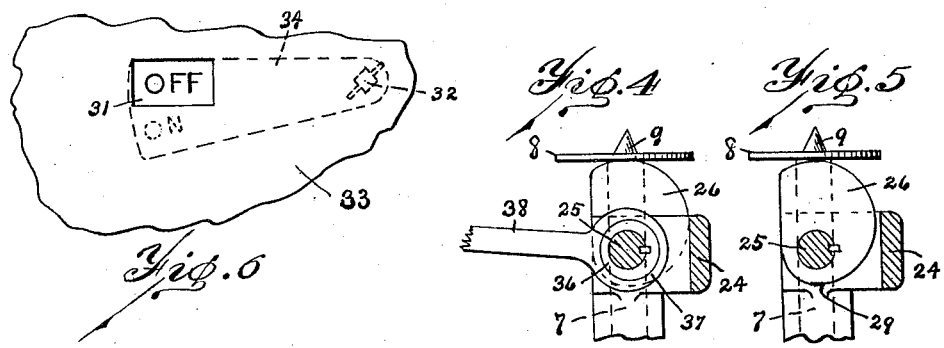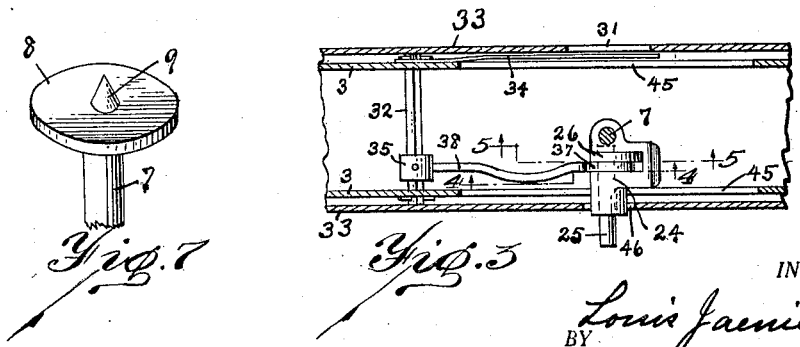

Patented June 1, 1926.

1,586,747

UNITED STATES PATENT OFFICE.

LOUIS JAENICHEN, OF DETROIT, MICHIGAN, ASSIGNOR TO THE STANDARD COMPUTING SCALE COMPANY, OF DETROIT, MICHIGAN, A CORPORATION OF MICHIGAN.

SCALE.

Application filed July 7, 1921. Serial No. 482,948.

This invention relates to that type of scale in which the loads are resisted by springs and in which the relative distances through which the load receivers move are indicated by proper charts and pointers or wires, the springs being connected to the load supporting members of the scales and to normally stationary supports, and the object of this invention is to provide adjustable supports for the normally stationary ends of the springs so that proper adjustments may be made for "tare" and so that the indicators will show the tare and the net weights of the bodies on the load receivers.

This invention consists, in combination with scale springs and a support therefor, of means for shifting this support to vary the initial position of the springs, and of an indicator whereby this movement of the support may be made known.

It also consists in the details of construction illustrated in the accompanying drawings and particularly pointed out in the claims.

In the drawings, Fig. 1 is an elevation of a spring scale embodying my present invention. Fig. 2 is an elevation of the upper part thereof with a portion of the pedestal and of the side plates broken away to disclose the mechanism therein. Fig. 3 is a plan of a portion of this mechanism. Figs. 4 to 7 inclusive are details of the spring-support elevating mechanism and the indicator which may be connected thereto, Figs. 4 and 5 being sections on the lines 4—4 and 5—5 of Fig. 3. Fig. 8 is an elevation of another type of indicator. Fig. 9 is a section on the line 9—9 of Fig. 8. Fig. 10 is a detail of this indicator, the top being broken away to disclose the brake shoe. Fig. 11 is an elevation of this improved tare compensating and indicating mechanism. Fig. 12 is a section of the lower end thereof. Fig. 13 is a perspective of the lower end of a guide tube. Fig. 14 is an elevation of a support and adjusting screw.

Similar reference numerals refer to like parts throughout the several views.

Bulk goods such as nails and many groceries are often weighed in scale pans or scoops and even-balance scales are usually provided with a counterweight or poise for such implements. Spring scales are usually so constructed that counterweights cannot be used and I have designed the present mechanism to give the user the advantages of the counterweight without the objections thereto.

The scale shown in the drawings is generally of well known construction and has a horizontal drum rotated by a rack bar connected to the weighing levers which support a platform 1, the rack bar, levers and drum not being shown, but the base 2, pedestal 3 and drum case 4 being of well known design.

In the present design, a bracket 5 on the inside of the pedestal 3, near its top, guides a tube 6 in which a rod 7 is vertically slidable. This rod has a horizontal plate 8 near its upper end 9, which is conical, and on this pointed end is mounted a cross bar 10 which carries the bolts 11 by which the scale springs 12 are suspended. Rods 13 depending from the lower ends of the springs connect to the lever system, but as the bolts 11, springs 12 and rods 13 are well known, no further showing is made. The novel features of this present device begin with the construction of the mechanism supporting the cross bar 10.

As indicated in Figs. 11 to 14 inclusive, the tube 6 has a notch 15 in its lower end so the tube may fit over the arm 16 of a bell-crank lever pivoted on the pin 17 carried by the bracket 18. The lower end of this bracket is threaded to receive the hollow screw 19 mounted in the front wall of the pedestal 3 by means of which the bracket is held in position. An adjustable screw 20 mounted in the screw 19 engages the lower arm 22 of the bell crank and by its position the height of the tube 6 is determined. As the tube 6 is elevated or lowered by the screw 20 and the bell-crank lever 16—22, the position of the springs and the parts connected thereto are varied in order to properly position the weight indicator. It may therefore be termed a zero-setting device.

At the upper end of the tube 6 and movable therewith is a bracket 24 which carries a shaft 25 on which a cam 26 is mounted. This cam supports the disk 8, the rod 7, point 9, cross bar 10 and the springs 12. When this device is designed to simply take care of the scale pan 27, only two positions of the cam need be considered, that is, when the plate is elevated to its full height and when the pointer 28 on the outer end of this shaft 25 is at the "On" position, or when the plate 8 is lowered and the pointer 28 is at the "Off" position shown in Fig. 1. When the bar 10 is elevated, as indicated in Figs. 2 and 4, the bottoms of the springs 12 are lifted the exact distance that they were pulled down by the weight of the scale pan 27 so that this "tare" is taken care of and the weight indicator will be at zero with an empty pan. When no scale pan is used, the cam 26 is turned until the plate 8 rests on the low point 29 of the cam (Fig. 5) when the indicator will again be at zero with an empty scale. The pedestal has a slot 30 through which the bracket 24 extends.

Scales are often built with side plates 33 attached to the upper ends of the pedestals, as indicated in Figs. 1, 2 and 3. In such cases the front and rear faces of the top or head of the pedestal may be apertured as indicated at 45, and the front side plate is formed with a slot 46 to permit the free movement of the front end of the bracket 24.

In order that proper indication may be made at the opposite side of the pedestal 3, an opening 31 may be made in the rear side plate 33, as shown in Fig. 6. A shaft 32 is pivoted in the front and back of the pedestal and a vane 34 attached thereto, which vane has the words "On" and "Off" thereon positioned so that either may show through this opening 31. A small crank 35 is mounted on the shaft 32 and an eccentric 36 is mounted on the shaft 25. The yoke 37 and link 38 connect this eccentric and crank arm in such a manner that the movement of the pointer 28 is indicated by the words on the vane 34.

Where a greater range of "tare" deductions is desired, a graduated scale bar 40 may be mounted on the bracket 24, being provided with three arms 47, as indicated in Figs. 8 and 9. The character of these graduations will depend upon the stiffness of the springs and the throw of the cam 26, but the weight necessary to stretch the springs a distance equal to the throw of the cam may be indicated by the pointer 28 and the scale bar 40 and may be divided and designated as desired. In order to hold the pointer at any desired point, a brake shoe 43 is provided, mounted in the pointer 28 to engage the inner edge of the scale bar 40 under pressure of the spring 44. In this case the receptacle, whether plate or bowl, is placed upon the platform and the pointer 28 is swung clockwise until the weight indicator is at zero. If the graduations on the scale bar 40 are for pounds and ounces, a predetermined tare may be taken care of.

The details and proportions of this device may all be changed by skilled scale makers without departing from the spirit of my invention as set forth in the following claims.

I claim:—

1. In a scale, the combination of a load resisting spring mechanism and a support therefor, means to initially adjust said spring mechanism relative to the support, load receiving means adapted to receive a container and to communicate the load to said spring mechanism, an adjustable cam to move said support the distance the spring is stretched by the container, and means to retain said cam in its adjusted position.

2. In a scale, the combination of a load resisting spring mechanism and a support therefor, means to initially adjust said spring mechanism relative to the support, load receiving means adapted to receive a container and to communicate the load to said spring mechanism, an adjustable cam to move said support the distance the spring is stretched by the container, means to retain said cam in its adjusted position, and means connected to the cam to indicate that the scoop or pan is off the load receiving means.

3. In a scale, the combination of load resisting springs, means to communicate the force of a load to the lower ends thereof, a cross bar and adjustable means to connect the upper end of the springs thereto, a cam to elevate the cross bar, means to indicate the weight of the load on the scale and an independent indicator whereby the position of the cross bar may be determined.

4. In a scale, the combination of a load resisting spring mechanism means to communicate the force of a load to the lower end of the spring mechanism, a tube, a stem slidable therein, means connecting the upper end of the spring mechanism to said stem, a bracket at the upper end of the tube, and means mounted on the bracket to change the height of the stem.

5. In a scale, the combination of a load resisting spring mechanism, means to communicate the force of a load to the lower end of the spring mechanism, a tube, a stem slidable therein, means connecting the upper end of the spring mechanism to said stem, a bracket at the upper end of the tube, and means mounted on the bracket to change the height of the stem and embodying a shaft mounted in the bracket, a cam on the shaft and a plate attached to the stem and resting on the cam.

6. In a scale, the combination of a load resisting spring mechanism means to communicate the force of a load to the lower end of the spring mechanism, a tube, a stem slidable therein, means connecting the upper end of the spring mechanism to said stem, a bracket at the upper end of the tube, means mounted on the bracket to change the height of the stem, and means to initially position said tube.

7. In a scale, the combination of a load resisting spring mechanism means to communicate the force of a load to the lower end of the spring mechanism, a tube, a stem slidable therein, means connecting the upper end of the spring mechanism to said stem, a bracket at the upper end of the tube, means mounted on the bracket to change the height of the stem and embodying a shaft mounted in the bracket, a cam on the shaft and a plate attached to the stem and resting on the cam, a pointer to turn the shaft, and a graduated scale bar concentric with said shaft and over which the pointer may be moved.

LOUIS JAENICHEN.